United States Patent
Thamer et al.

(10) Patent No.: US 12,055,454 B2
(45) Date of Patent: Aug. 6, 2024

(54) DEVICE FOR DETERMINING A STEERING TORQUE IN A MOTOR VEHICLE

(71) Applicant: Hella GmbH & Co. KGaA, Lippstadt (DE)

(72) Inventors: Steffen Thamer, Bochum (DE); Harm Wesselink, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 305 days.

(21) Appl. No.: 17/647,668

(22) Filed: Jan. 11, 2022

(65) Prior Publication Data

US 2022/0128421 A1 Apr. 28, 2022

Related U.S. Application Data

(63) Continuation of application No. PCT/EP2020/069897, filed on Jul. 14, 2020.

(30) Foreign Application Priority Data

Jul. 31, 2019 (DE) ............. 10 2019 120 654.5

(51) Int. Cl.
*G01L 3/10* (2006.01)
*G01L 5/22* (2006.01)

(52) U.S. Cl.
CPC ............. *G01L 3/101* (2013.01); *G01L 5/221* (2013.01)

(58) Field of Classification Search
CPC ......... G01L 3/101; G01L 5/221; G01L 3/104; B62D 6/10
See application file for complete search history.

(56) References Cited

U.S. PATENT DOCUMENTS

| | | | | |
|---|---|---|---|---|
| 7,047,824 B2 * | 5/2006 | Nakane | ................... | G01L 5/221 73/862.331 |
| 9,347,843 B2 * | 5/2016 | Franz | ...................... | G01L 5/221 |
| 11,860,053 B2 * | 1/2024 | Fröhlich | ................. | G01L 3/104 |
| 2003/0037622 A1 * | 2/2003 | Laidlaw | ................... | G01L 3/104 73/862.333 |
| 2023/0106907 A1 * | 4/2023 | Oswald | ................... | G01L 5/221 73/862.325 |

FOREIGN PATENT DOCUMENTS

| | | | | |
|---|---|---|---|---|
| DE | 10222118 A1 | 11/2002 | | |
| DE | 102007057050 A1 | 7/2008 | | |
| DE | 102013109448 A1 * | 3/2014 | ............. | H02K 1/145 |
| JP | 5399713 B2 * | 1/2014 | ............. | G01L 3/104 |
| KR | 20100092243 A * | 8/2010 | | |
| WO | 2018195373 A1 | 10/2018 | | |

* cited by examiner

*Primary Examiner* — Octavia Davis Hollington
(74) *Attorney, Agent, or Firm* — Husch Blackwell LLP

(57) ABSTRACT

A device is provided for determining a steering torque in a motor vehicle. The device includes a first shaft, a second shaft, a twistable connector, a stator, a multipole magnet, a first sensor, and a second sensor. The first shaft is connected to the second shaft via the twistable connector, and the magnet is fixed to the first shaft. The stator is fixed to the second shaft, and the first sensor is designed for measuring, in the case of a relative rotary movement of the magnet relative to the stator, a first magnetic flux density in a first direction. The second sensor is designed for measuring a second magnetic flux density in a second direction. The second direction is opposite to the first direction, and the second sensor is arranged to be rotationally offset by more than 90° relative to the first sensor.

14 Claims, 4 Drawing Sheets

DEVICE FOR DETERMINING A STEERING TORQUE IN A MOTOR VEHICLE

CROSS REFERENCE TO RELATED APPLICATIONS

This application is a continuation of and claims priority to PCT Application No. PCT/EP2020/069897, filed Jul. 14, 2020, which itself claims priority to German Application No. 10 2019 120654.5, filed on Jul. 31, 2019, the entireties of both of which are hereby incorporated by reference.

FIELD OF THE INVENTION

The present invention relates to a device for determining a steering torque in a motor vehicle.

BACKGROUND OF THE INVENTION

Devices for determining the steering torque are known from the current state of technology. They are used with electromechanical steering systems to determine to the extent possible the steering torque exerted and to steer the wheels of the motor vehicle depending on such steering torque. In this context, the steering torque can be exerted by the driver using a means of steering, such as a steering wheel, or by means of the surface on which the vehicle is moving.

A device with an input shaft, an output shaft, a twistable means of connection, a stator means and multi-pole magnetic means is known from WO 2018/195373 A1. The magnetic means is fixed to the input shaft. The stator means is fixed to the output shaft. The input shaft is connected to the output shaft via the twistable means of connection. The stator means comprises three stator elements each arranged adjacent to each other, where an air gap is arranged between the stator elements. A first sensor means is arranged between one of the first stator elements and one of the second stator elements. A second sensor means is arranged between the second stator element and one of the third stator elements.

Twisting of the input shaft relative to the output shaft creates a magnetic flux between the stator elements. In this context, the flux direction between the first and the second stator element is opposite to the flux direction between the second and the third stator element. For calculating the steering torque, the two flux densities measured are vectorially subtracted from each other such that the amount increases due to the opposite direction. With vector subtraction, the influence of interference fields running parallel to the flux direction measured is reduced or even eliminated as they run in the same direction with both sensor means.

BRIEF SUMMARY OF THE INVENTION

In contrast, the present invention is based on the task of creating a less interference-prone device. In addition, the intention is to create a motor vehicle with such a device and such a procedure.

The device comprises a first shaft, a second shaft, a twistable means of connection, a stator means, a multi-pole magnetic means, a first sensor means and a second sensor means. In the context of this description, the twistable means of connection is understood in particular to be a means of connection that is twistable in itself. In a twisted state, an elastic self-aligning torque acts on the means of connection in the direction of the non-twisted state. This can be, for example, a torsion bar. The multi-pole magnetic means may, for example, comprise a single or several ring magnets. In particular, the ring magnet may comprise more than 2 poles, e.g. more than 6 poles. In this context, the poles can be arranged adjacent to each other in a geometric circle.

The first shaft is connected to the second shaft via the twistable means of connection. The magnetic means is fixed to the first shaft. The stator means is fixed to the second shaft. The first sensor means is designed for measuring a first magnetic flux density in a first direction in the case of a relative rotary movement of the magnetic means relative to the stator means. In this context, this first magnetic flux density comprises a first indication of the steering torque. The larger the amount of the first flux density is, the larger the steering torque exerted by a driver or the surface on which the motor vehicle is moving.

The second sensor means is designed for measuring a second magnetic flux density in a second direction in the case of the relative rotary movement of the magnetic means relative to the stator means. In this context, the second direction is opposite to the first direction. The second magnetic flux density also comprises an indication of the steering torque. The larger the amount of the second flux density is, the larger the steering torque exerted by a driver or the surface on which the motor vehicle is moving. As known from the state of technology, the second magnetic flux density can be vectorially subtracted from the first magnetic flux density such that the influence of interference fields in the direction parallel to one of the flux directions can be reduced or even eliminated.

The second sensor means is arranged rotationally offset by more than 90°, preferentially more than 150°, relative to the first sensor means. A rotational offset of 180° is especially preferable. In this context, it should be noted that translational spacing of the two sensor means can be provided for in addition to the rotational offset. This can be advantageous especially with a view to being able to measure the flux densities in different directions. The axis around which the second sensor means is offset relative to the first sensor means can, in particular, be the same axis around which the shafts are rotatable and the means of connection are twistable.

The rotationally offset arrangement of the second sensor means relative to the first sensor means is advantageous to reduce or eliminate interference fields in a direction vertical to the measured flux direction. Tests have shown, for example, that the influence of interference fields in a transverse direction to the device can be reduced in this way if the flux density in the vertical direction of the motor vehicle is being measured. In this context, a transverse direction is understood in particular to be a direction arranged vertically to the direction in which the magnetic flux density is being measured.

In accordance with one embodiment of the invention, the stator means may comprise a first, a second, a third and a fourth stator element. An air gap can be arranged in each case between the first and the second stator element and between the third and the fourth stator element. This air gap can be advantageous in allowing the magnetic flux densities to be measured. The stator elements can in particular be arranged to be adjacent to each other. This may in particular mean that no other component is arranged between the stator elements.

Use of four stator elements has in particular the advantage that the stator means can be manufactured in a simpler and less expensive manner than in the state of technology. Four stator elements facilitate a simpler design and construction of the individual stator elements. In particular, the second and the third stator element can be manufactured using simple mechanical processing methods such as punching and bending. This is not the case with the middle stator element from WO 2018/195373 A1.

In accordance with one embodiment of the invention, the first sensor means can be arranged between the first and the second stator element. The second sensor means can be arranged between the third and the fourth stator element. This arrangement can be advantageous in order to be able to measure the magnetic flux densities in opposite directions.

In accordance with one embodiment of the invention, the first shaft can be designed as an input shaft and the second shaft as an output shaft. The input shaft can in particular be connected to a steering wheel of the motor vehicle, whereas the output shaft can be connected to the wheels of the motor vehicle.

In accordance with one embodiment, each of the stator elements can surround the magnetic means. It is in particular possible for the magnetic means and the stator elements to be arranged concentrically to each other.

In accordance with one embodiment of the invention, the first sensor means can comprise a first sensor element and a second sensor element. The second sensor means can comprise a third sensor element and a fourth sensor element. The first sensor element and the second sensor element can be arranged rotationally offset to each other. The same applies to the third and the fourth sensor element. In this context, the offsetting of the sensor means to each other can be arranged around the same axis as the offsetting of the sensor means relative to each other.

The use of the sensor elements is especially advantageous to reduce the influence of magnetic interference fields in a further direction vertical to the measured flux directions. Tests have shown, for example, that the influence of interference fields in a longitudinal direction of the device can be reduced in this way. In this context, the longitudinal direction can extend in particular vertically to the direction in which the magnetic flux density is being measured. In addition, the longitudinal direction can extend vertically to the transverse direction.

In accordance with one embodiment of the invention, the device may comprise a calculation means. The first sensor means and the second sensor means can be designed in such a way that each emits a signal to the calculation means. The respective signal can comprise an indication of the magnetic flux density measured in each case. The calculation means can be designed to use the signals to calculate the steering torque.

In accordance with one embodiment of the invention, the first and the second sensor means can each comprise a hall sensor. This is a particularly simple design to use the magnetic flux densities.

In accordance with one embodiment of the invention, each of the stator elements feature protrusions and spaces arranged between the protrusions. The protrusions of the first stator element may extend into the spaces of the second stator element. The protrusions of the second stator element may extend into the spaces of the first stator element. The protrusions of the third stator element may extend into the spaces of the fourth stator element. The protrusions of the fourth stator element may extend into the spaces of the third stator element.

In accordance with one embodiment of the invention, each of the stator elements may comprise a body and a first cantilever. The respective protrusions and the respective first cantilever are arranged on the body of the respective stator element. The cantilever may in particular be designed to be L-shaped. It is in particular possible for the cantilevers to feature a first leg that extends roughly vertically away from the respective protrusion. In addition, the cantilevers may feature a second leg that extends roughly parallel to the respective protrusion. In this context, the first cantilever of the first stator element can be arranged opposite the first cantilever of the second stator element. The first cantilever of the third stator element can be arranged opposite the first cantilever of the fourth stator element. In this context, the second legs of two first cantilevers arranged opposite to each other can extend towards each other starting from the respective first leg.

In accordance with one embodiment of the invention, the first sensor means can be arranged on the first cantilever of the first or the second stator element. The second sensor means can be arranged on the first cantilever of the third or the fourth stator element. This arrangement is especially advantageous for precise measurement of the magnetic flux densities.

In accordance with one embodiment of the invention, each of the stator elements may comprise a second cantilever. In this context, the second cantilevers can be shaped exactly like or similar to the description of the first cantilever above. The second cantilever can be arranged in each case on the body of the respective stator element. A third sensor means can be arranged on the second cantilever of the first or the second stator element. A fourth sensor means can be arranged on the second cantilever of the third or the fourth stator element. The third sensor means can be arranged rotationally offset by more than 90°, preferentially by more than 150°, especially preferentially by 180°, to the first sensor means. The fourth sensor means can be arranged rotationally offset by more than 90°, preferentially by more than 150°, especially preferentially by 180°, to the second sensor means. The third and the fourth sensor means are advantageous for more precise determination of the steering torque.

In accordance with one embodiment of the invention, each of the stator elements can be designed to be ring-shaped.

The motor vehicle according to claim 14 comprises a device in accordance with one embodiment of the invention, a means of steering such as a steering wheel and steerable wheels. The means of steering is designed to exert a torque on the first shaft. The second shaft is designed is such a way as to exercise a torque on the steerable wheels. This torque can in particular achieve a pivoting of the wheels around a vertical axis of the motor vehicle.

In the case of the procedure according to claim 15, the first and the second magnetic flux density are measured in the respective directions. The flux densities are subsequently vectorially subtracted from each other such that the amount is increased and the influence of interference fields is reduced. The steering torque is then calculated with the result from the vector subtraction.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
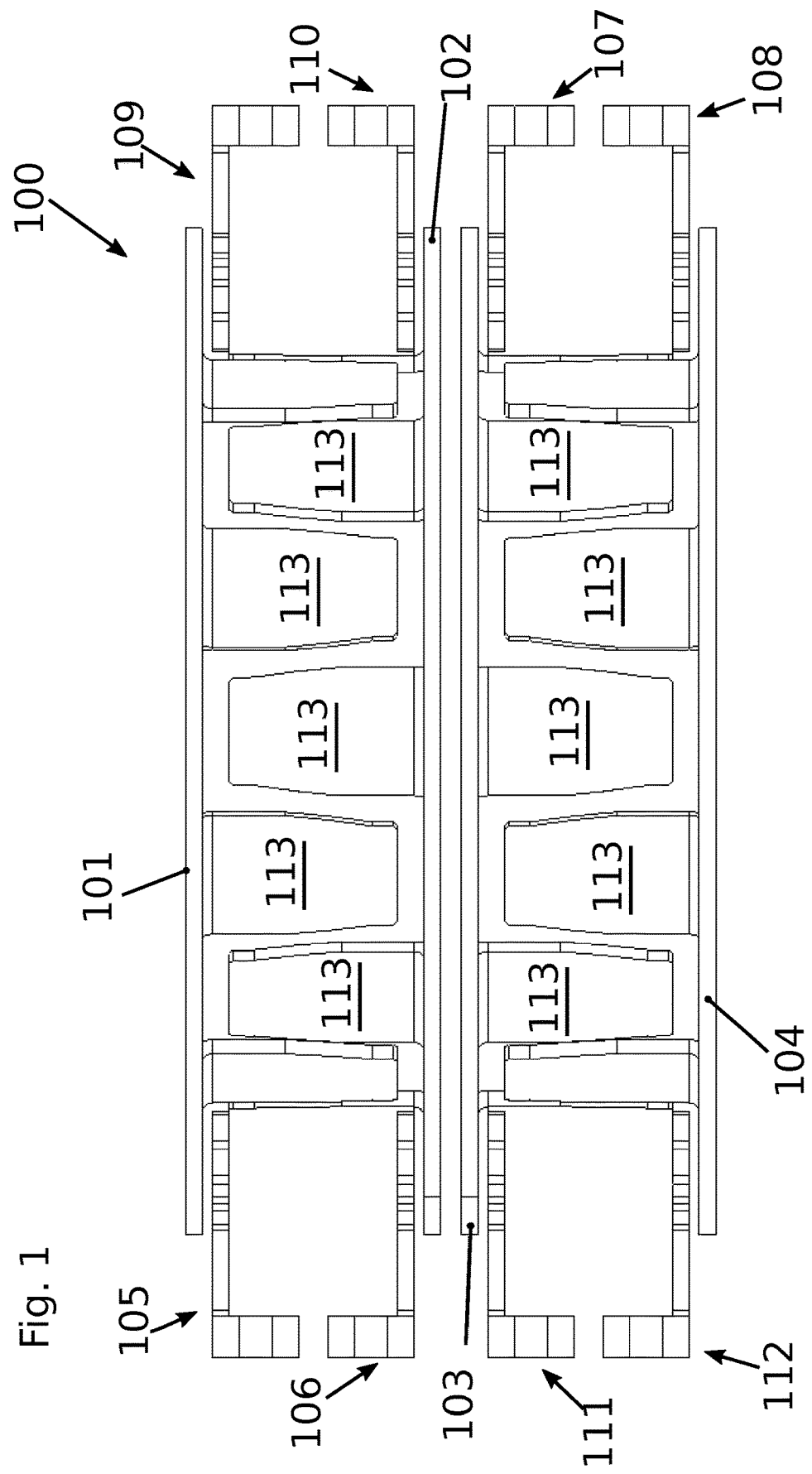
FIG. 1 is a schematic side view of a stator means in accordance with an embodiment of the invention with four stator elements and eight L-shaped cantilevers.

The stator means 100 comprises a first stator element 101, a second stator element 102, a third stator element 103 and a fourth stator element 104. There is an air gap arranged between each of the stator elements 101-104. The first stator element 101 is arranged adjacent to the second stator element 102. The second stator element 102 is arranged between the first stator element 101 and the third stator element 103. The third stator element 103 is arranged between the second stator element 102 and the fourth stator element 104.

Each of the stator elements 101-104 features protrusions 113 between which spaces are arranged. In this context, the protrusions 113 of the first stator element 101 protrude into the spaces of the second stator element 102. The protrusions 113 of the second stator element 102 protrude into the spaces of the first stator element 101. The protrusions 113 of the third stator element 103 protrude into the spaces of the fourth stator element 104. The protrusions 113 of the fourth stator element 104 protrude into the spaces of the third stator element 103. The protrusions are arranged on a ring-shaped body of each of the stator elements.

An L-shaped cantilever 105 is arranged on the body of the first stator element 101. An L-shaped cantilever 106 is arranged on the body of the second stator element 102. In this context, the cantilever 105 is arranged opposite the cantilever 106. Each of cantilevers 105 and 106 features a first leg protruding vertically away from the body and a leg arranged parallel to one of protrusions 113 that extends away from the first leg in the direction of the respective other cantilever 106 or 105. An L-shaped cantilever 107 is arranged on the third stator element 103 on the body. An L-shaped cantilever 108 is arranged on the fourth stator element 104 on the body. The cantilevers 107 and 108 are designed to be similar or identical to the cantilevers 105 and 106 described previously.

A further L-shaped cantilever 109-112 is arranged on each of the stator elements 101-104 rotationally offset to the cantilevers 105-108; these are designed to be similar or identical to the cantilevers 105-108 described previously. In this respect, the cantilevers 105, 106, 111 and 112 are rotationally offset by more than 90°, in particular more than 150°, namely by 180°, relative to the cantilevers 107-110.

When operating a device in accordance with an embodiment of the invention, the cantilevers 105-112 are used to arrange sensor means that are not shown in the figures. If the stator means 100 is, for example, arranged on an output shaft and surrounds a ring magnet that is arranged on an input shaft and the stator means 100 is moved rotationally relatively to the ring magnet, a magnetic flux is created between the cantilevers 105 and 106, between the cantilevers 107 and 108, between the cantilevers 109 and 110 and between the cantilevers 111 and 112. In this context, the flux direction between the cantilevers 105 and 106 and the cantilevers 109 and 110 is exactly opposite to the flux direction between the cantilevers 107 and 108 and the cantilevers 111 and 112.

A first sensor means, not shown in the figures, is arranged between the cantilevers 105 and 106. A second sensor means is arranged between the cantilevers 107 and 108. A third sensor means is arranged between the cantilevers 109 and 110. A fourth sensor means is arranged between the cantilevers 111 and 112. Vectorially subtracting the flux density between the cantilevers 105 and 106 measured with the sensor means from the flux density measured between the cantilevers 107 and 108 reduces the influence by magnetic interference fields that run parallel to one of the flux densities measured on the measurement. The same applies analogously for flux densities between the cantilevers 109 and 110, and the cantilevers 111 and 112 measured by sensor means.

Vector subtraction of the magnetic flux densities on cantilevers that are arranged rotationally offset to each other by more than 90°, in particular by more than 150°, specifically by 180° (e.g. cantilevers 105, 106 and 107, 108) is advantageous to reduce the influence of interference fields that run vertically to the measured flux densities. In the case of the stator means 100 in FIG. 1, this is the drawing level.

Figure 2:
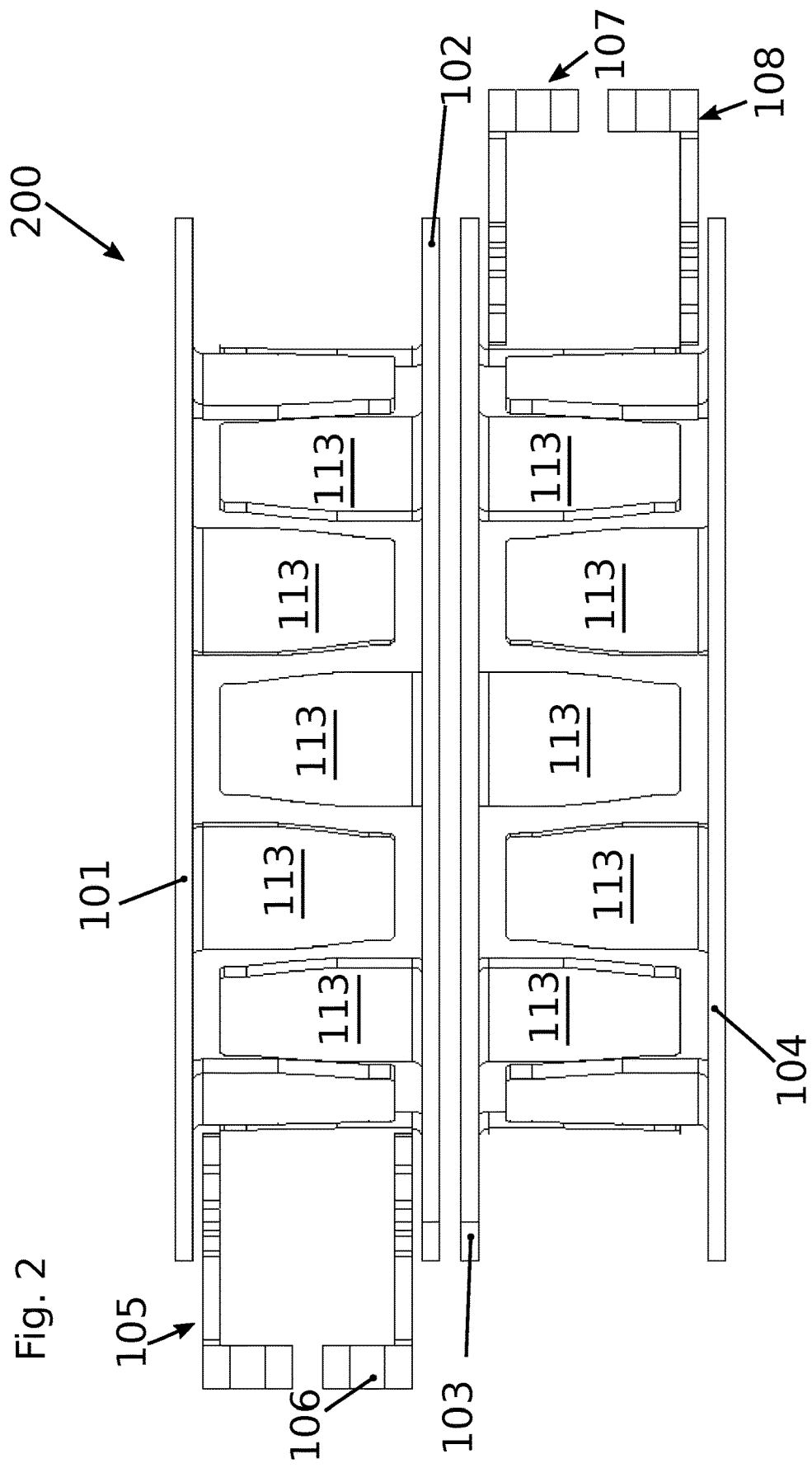
FIG. 2 is a schematic side view of a stator means in accordance with an embodiment of the invention with four stator elements and four L-shaped cantilevers.

The stator means 200 from FIG. 2 differs from stator means 100 from FIG. 1 essentially in that the cantilevers 109, 110, 111 and 112 are absent. This consequently leads to a weight reduction and less material being consumed in manufacturing. However, there is no change in the way it functions. Merely a little precision is lost as less measuring data is available. In this respect, it is important that the cantilevers 105 and 106 still in place are arranged rotationally offset relative to the cantilevers 107 and 108 by more than 90°, in particular by more than 150°, specifically by 180°.

Figure 3:
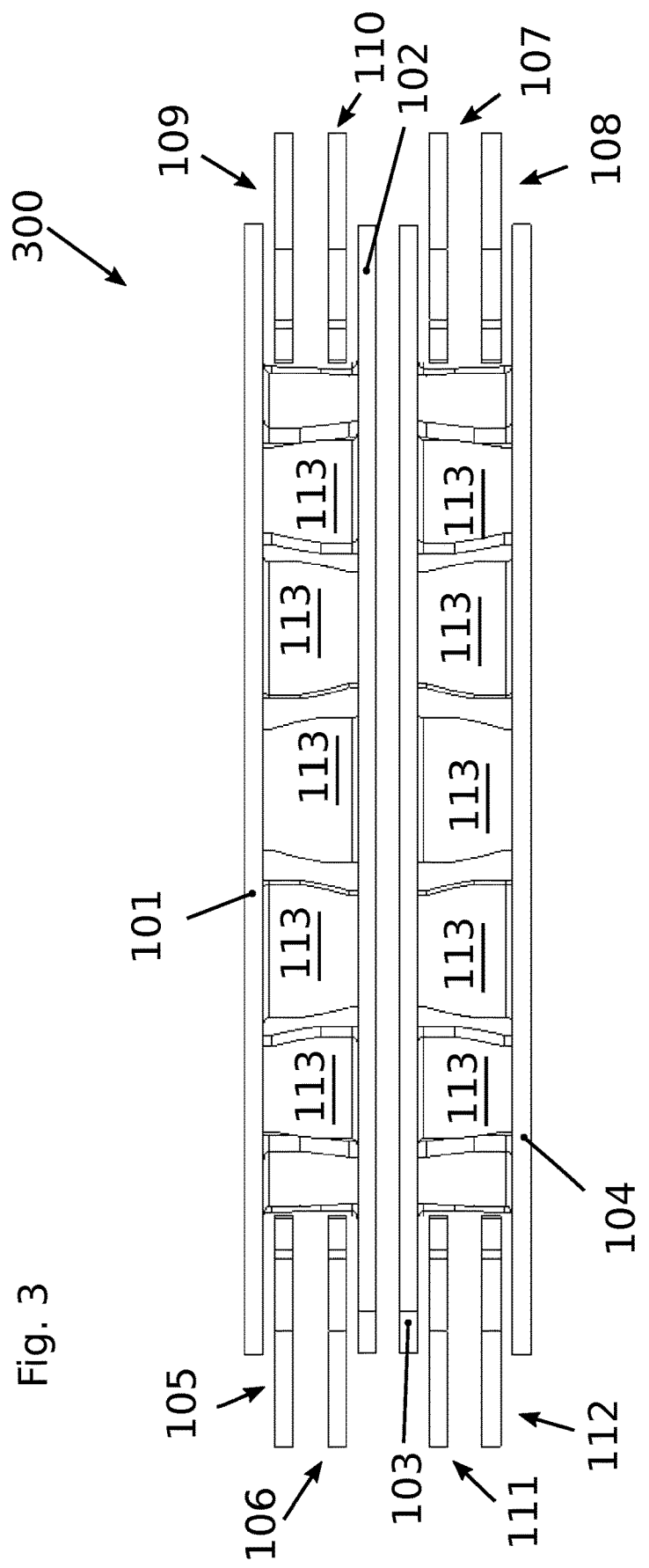
FIG. 3 is a schematic side view of a stator means in accordance with an embodiment of the invention with four stator elements and eight straight cantilevers.

The stator means 300 from FIG. 3 differs from the stator means 100 from FIG. 1 by the shape of the cantilevers 109, 110, 111 and 112. In this context, the manner of functioning remains basically the same.

Figure 4:
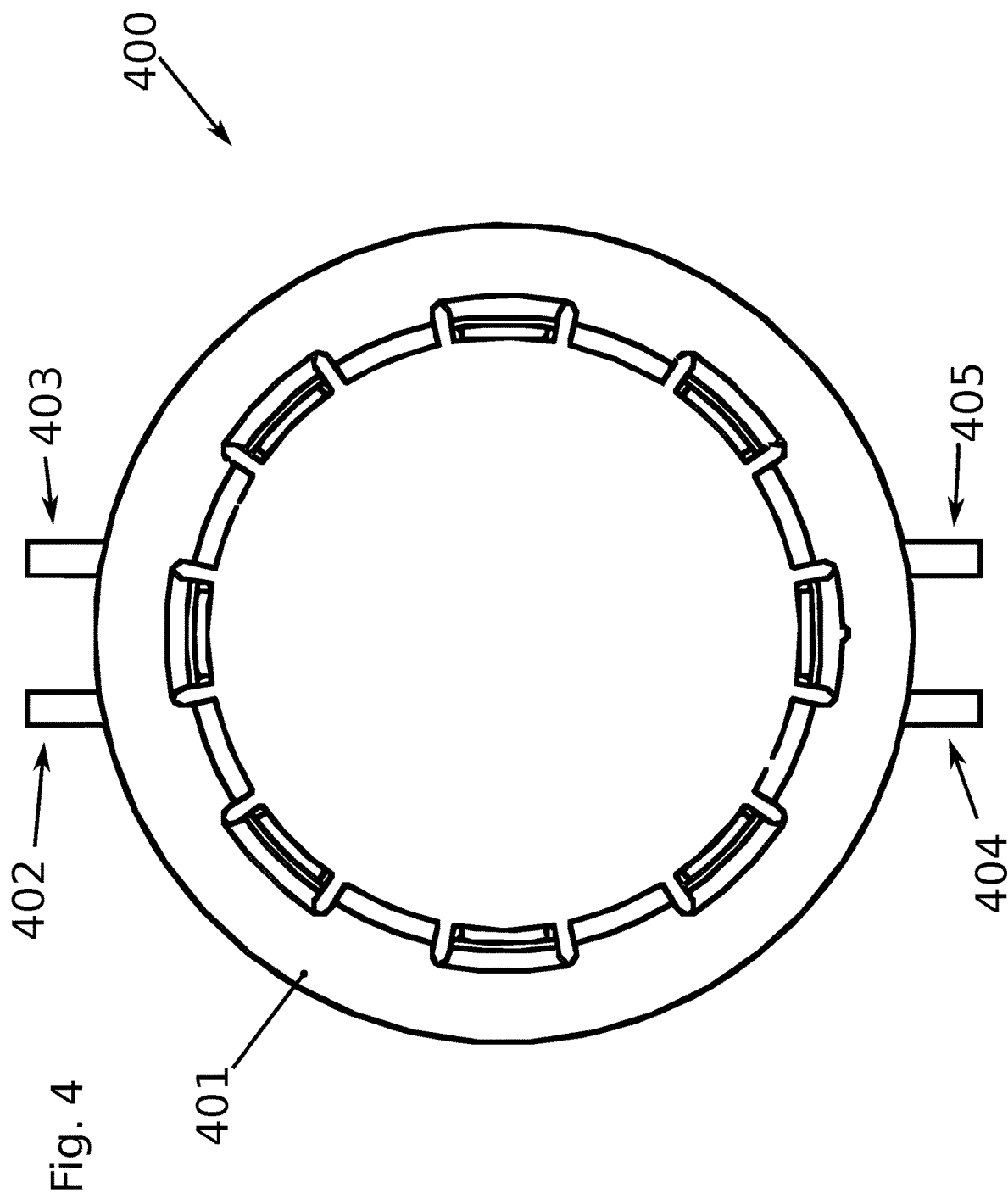
FIG. 4 is a schematic top view of a stator means in accordance with an embodiment of the invention with two cantilevers at each of the stator elements.

In the case of the stator means 400 from FIG. 4, double the number of cantilevers is provided for in comparison to the stator means 200 from FIG. 2. In this respect, the cantilevers 402 and 403 are arranged on the first stator element 401. These hide two further cantilevers arranged directly below them on the second stator element 401. The cantilevers 404 and 405 are arranged on the third stator element that likewise hide two further cantilevers arranged on the fourth stator element.

In this respect, the cantilevers 402 and 403 are arranged rotationally offset to each other. The same applies to the cantilevers hidden by them and the cantilevers 404 and 405 and the cantilevers hidden by the same. A sensor means can be arranged in each case between one of the cantilevers 402-405 and each of the cantilevers hidden by them. In this context, the manner of functioning is similar to the manner of functioning described in reference to FIGS. 1 and 2. The advantage is, in particular, that during vector subtraction of the measured values between the cantilever 405 and the cantilever hidden by the same from the measured values between the cantilever 402 and the cantilever hidden by the same, the influence of further interference fields in a further direction running vertically to the flux direction of the measured magnetic field can be reduced or even eliminated. The same applies to the vector subtraction of the measured values between the cantilever 404 and the cantilever hidden by the same from the measured values between the cantilever 403 and the cantilever hidden by the same.

LIST OF REFERENCE NUMBERS

100 Stator means
101 First stator element

102 Second stator element
103 Third stator element
104 Fourth stator element
105 Cantilever
106 Cantilever
107 Cantilever
108 Cantilever
109 Cantilever
110 Cantilever
111 Cantilever
112 Cantilever
113 Protrusion
200 Stator means
300 Stator means
400 Stator means
401 First stator element
402 Cantilever
403 Cantilever
404 Cantilever
405 Cantilever

The invention claimed is:

1. A device for determining a steering torque in a motor vehicle, the device comprising:
    a first shaft,
    a second shaft,
    a twistable means of connection, where the first shaft is connected to the second shaft via the twistable means of connection,
    a stator means fixed to the second shaft,
    a multi-pole magnetic means fixed to the first shaft,
    a first sensor means including a first sensor element and a second sensor element, the first sensor element and the second sensor element arranged rotationally offset with respect to one another, and
    a second sensor means including a third sensor element and a fourth sensor element, the third sensor element and the fourth sensor element arranged rotationally offset with respect to one another,
    wherein the first sensor means is designed for measuring, in the case of a relative rotary movement of the magnetic means relative to the stator means, a first magnetic flux density in a first direction,
    wherein the second sensor means is designed for measuring, in the case of the relative rotary movement of the magnetic means relative to the stator means, a second magnetic flux density in a second direction,
    wherein the second direction is opposite to the first direction, and
    wherein the second sensor means is arranged to be rotationally offset by more than 90° relative to the first sensor means.

2. The device in accordance with claim 1, wherein the stator means comprises a first stator element, a second stator element, a third stator element and a fourth stator element, where there is an air gap arranged in each case between the first stator element and the second stator element and between the third stator element and the fourth stator element.

3. The device in accordance with claim 2, wherein the first sensor means is arranged between the first stator element and the second stator element and that the second sensor means is arranged between the third stator element and the fourth stator element.

4. The device in accordance with claim 2, wherein each of the stator elements surrounds the magnetic means.

5. The device in accordance with claim 2, wherein the stator elements feature in each case protrusions and spaces arranged between the protrusions, where the protrusions of the first stator element protrude into the spaces of the second stator element, where the protrusions of the second stator element protrude into the spaces of the first stator element, where the protrusions of the third stator element protrude into the spaces of the fourth stator element and where the protrusions of the fourth stator element protrude into the spaces of the third stator element.

6. The device in accordance with claim 5, wherein the stator elements each comprise a body and a first cantilever, where the respective protrusions are arranged on the body of the respective stator element, where the first cantilever is arranged on the body of the respective stator element, where the first cantilever of the first stator element is arranged opposite the first cantilever of the second stator element and where the first cantilever of the third stator element is arranged opposite the first cantilever of the fourth stator element.

7. The device in accordance with claim 6, wherein the first sensor means is arranged on the first cantilever of the first stator element or on the first cantilever of the second stator element and that the second sensor means is arranged on the first cantilever of the third stator element or on the first cantilever of the fourth stator element.

8. The device in accordance with claim 2, wherein the stator elements are each designed to be ring-shaped.

9. The device in accordance with claim 1, wherein the first shaft is designed as an input shaft and the second shaft as an output shaft.

10. The device in accordance with claim 1, wherein the device further comprises a calculation means, where the first sensor means and the second sensor means are designed for emitting a signal to the calculation means, where each of the signals comprises an indication of the magnetic flux density measured in each case and where the calculation means is designed to use the signals to calculate the steering torque.

11. The device in accordance with claim 1, wherein the first and the second sensor means each comprise a hall sensor.

12. A motor vehicle comprising a device in accordance with claim 1, and further comprising a means of steering and steerable wheels, where the means of steering is designed to exert a torque on the first shaft and where the second shaft is designed to exert a torque on the steerable wheels.

13. A device for determining a steering torque in a motor vehicle, the device comprising:
    a first shaft,
    a second shaft,
    a twistable means of connection, where the first shaft is connected to the second shaft via the twistable means of connection,
    a stator means fixed to the second shaft, the stator means including a first stator element, a second stator element, a third stator element, and a fourth stator element, where there is an air gap arranged in each case between the first stator element and the second stator element and between the third stator element and the fourth stator element,
    a multi-pole magnetic means fixed to the first shaft,
    a first sensor means including a first sensor element and a second sensor element, the first sensor element and the second sensor element arranged rotationally offset with respect to one another, and
    a second sensor means including a third sensor element and a fourth sensor element, the third sensor element and the fourth sensor element arranged rotationally offset with respect to one another, wherein the first sensor means is designed for measuring, in the case of a relative rotary movement of the magnetic means relative to the stator means, a first magnetic flux density in a first direction, wherein the second sensor means is designed for measuring, in the case of the relative rotary movement of the magnetic means relative to the stator means, a second magnetic flux density in a second direction, wherein the second direction is opposite to the first direction, wherein the second sensor means is arranged to be rotationally offset by more than 90° relative to the first sensor means, wherein the first stator element, the second stator element, the third stator element, and the fourth stator element feature in each case protrusions and spaces arranged between the protrusions, where the protrusions of the first stator element protrude into the spaces of the second stator element, where the protrusions of the second stator element protrude into the spaces of the first stator element, where the protrusions of the third stator element protrude into the spaces of the fourth stator element, and where the protrusions of the fourth stator element protrude into the spaces of the third stator element, wherein the first stator element, the second stator element, the third stator element, and the fourth stator element each include a body and a first cantilever, where the respective protrusions are arranged on the body of the respective stator element, where the first cantilever is arranged on the body of the respective stator element, where the first cantilever of the first stator element is arranged opposite the first cantilever of the second stator element and where the first cantilever of the third stator element is arranged opposite the first cantilever of the fourth stator element, wherein the first sensor means is arranged on the first cantilever of the first stator element or on the first cantilever of the second stator element and where the second sensor means is arranged on the first cantilever of the third stator element or on the first cantilever of the fourth stator element, and wherein the stator elements each comprise a second cantilever, where the second cantilever is arranged on the body of the respective stator element, where a third sensor means is arranged on the second cantilever of the first sensor element or on the second cantilever of the second stator element and a fourth sensor means is arranged on the second cantilever of the third stator element or on the second cantilever of the fourth stator element, where the third sensor means is arranged rotationally offset by more than 90° to the first sensor means and where the fourth sensor means is arranged rotationally offset by more than 90° to the second sensor means.

14. A device for determining a steering torque in a motor vehicle, the device comprising:
a first shaft,
a second shaft,
a twistable means of connection, where the first shaft is connected to the second shaft via the twistable means of connection,
a stator means fixed to the second shaft,
a multi-pole magnetic means fixed to the first shaft,
a first sensor means designed for measuring, in the case of a relative rotary movement of the magnetic means relative to the stator means, a first magnetic flux density in a first direction,
a second sensor means designed for measuring, in the case of the relative rotary movement of the magnetic means relative to the stator means, a second magnetic flux density in a second direction, wherein the second direction is opposite to the first direction, and wherein the second sensor means is arranged to be rotationally offset by more than 90° relative to the first sensor means, and
a method for determining a steering torque in a vehicle with the device, the method comprising the following steps:
measuring the first magnetic flux density in the first direction using the first sensor means;
measuring the second magnetic flux density in the second direction using the second sensor means;
performing vector subtraction of the second magnetic flux density from the first magnetic flux density; and
using results of the vector subtraction in the calculation of the steering torque.

* * * * *